United States Patent [19]
Okamura et al.

[11] 4,195,797
[45] Apr. 1, 1980

[54] TAPE CASSETTE

[75] Inventors: Masatoshi Okamura; Haruo Shiba, both of Tokyo, Japan

[73] Assignee: TDK Electronics Company, Limited, Tokyo, Japan

[21] Appl. No.: 933,533

[22] Filed: Aug. 14, 1978

[30] Foreign Application Priority Data

Nov. 18, 1977 [JP] Japan ................. 52-155057

[51] Int. Cl.² ................. G03B 1/04; G11B 15/32
[52] U.S. Cl. ................. 242/199
[58] Field of Search ................. 242/197–200, 242/204; 352/72, 78 R; 360/96, 132

[56] References Cited

U.S. PATENT DOCUMENTS

| | | | |
|---|---|---|---|
| 2,676,766 | 4/1954 | Ross et al. | 242/76 |
| 2,951,654 | 9/1960 | Steelman | 242/198 |
| 3,070,322 | 12/1962 | Razis | 242/198 |

*Primary Examiner*—Leonard D. Christian
*Attorney, Agent, or Firm*—Oblon, Fisher, Spivak, McClelland & Maier

[57] ABSTRACT

A tape cassette braking mechanism which includes a resilient plate having a flat part and two bent parts wherein the flat part is contacted with a side wall of a half-case of the tape cassette and the two bent parts are respectively contacted with corresponding brakes such that the tape is effectively held without loosing the same in the tape cassette.

3 Claims, 2 Drawing Figures

TAPE CASSETTE

BACKGROUND OF THE INVENTION

1. FIELD OF THE INVENTION

The present invention relates to a tape cassette which has means for preventing loosing of a tape in the tape cassette.

2. DESCRIPTION OF THE PRIOR ART

Video tape cassettes have been used as well as audio tape cassettes.

Sever conditions are required for the video tape cassette over those of the audio tape cassettes. For example, a braking mechanism is connected to prevent loosing of the tape during the non-use state.

One embodiment of the braking mechanism of the conventional tape cassette will be illustrated.

As shown in FIG. 1, a brake (3) in a supply side and a brake (4) in a take-up side and a lever (2) for releasing the brake are connected in a half-case (1). An edge (5b) of a spring (5) is contacted with a projection (3a) of the brake (3) in the supply side and the other edge (5a) of the spring (5) is held between the polar members (8), (9). An edge (6b) of the spring (6) is contacted with a projection (4a) of the brake (4) in the take-up side and the other edge (6a) of the spring (6) is held between the polar members (10), (11). When the tape cassette is not set in an apparatus, the brakes are respectively interlocked to the teeth (12) formed on a reel (7) in the take-up side and to the teeth (not shown) formed on a reel in the supply side. The lower half-case (1) is assembled with an upper half-case (not shown) by screwing such together with a screw (13).

In the conventional tape cassette, the coil springs are used for the braking mechanisms whereby two coil springs are required for one tape cassette and parts for holding the edges of the coil springs should be molded on the half-cases and the requirement of these parts results in increased cost of the tape cassette.

SUMMARY OF THE INVENTION

It is an object of the present invention to provide a tape cassette having a simple braking mechanism for holding the tape without loosing of the tape.

The foregoing and other objects of the present invention have been attained by providing a tape cassette which comprises a resilient plate having a flat part and two bent parts wherein the flat part is contacted with a side wall of a half-case and the two bent parts are respectively contacted with the corresponding brakes.

DETAILED DESCRIPTION OF THE PREFERRED EMBODIMENT

Figure 1:
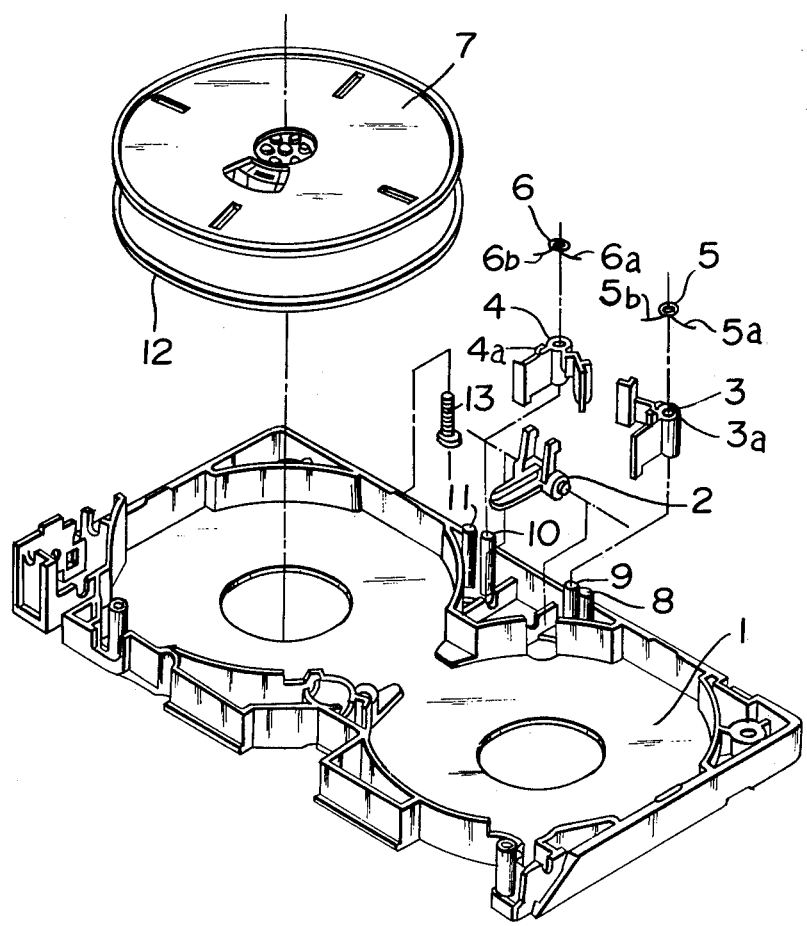
FIG. 1 is a partially assembled schematic view of the conventional tape cassette.
Figure 2:
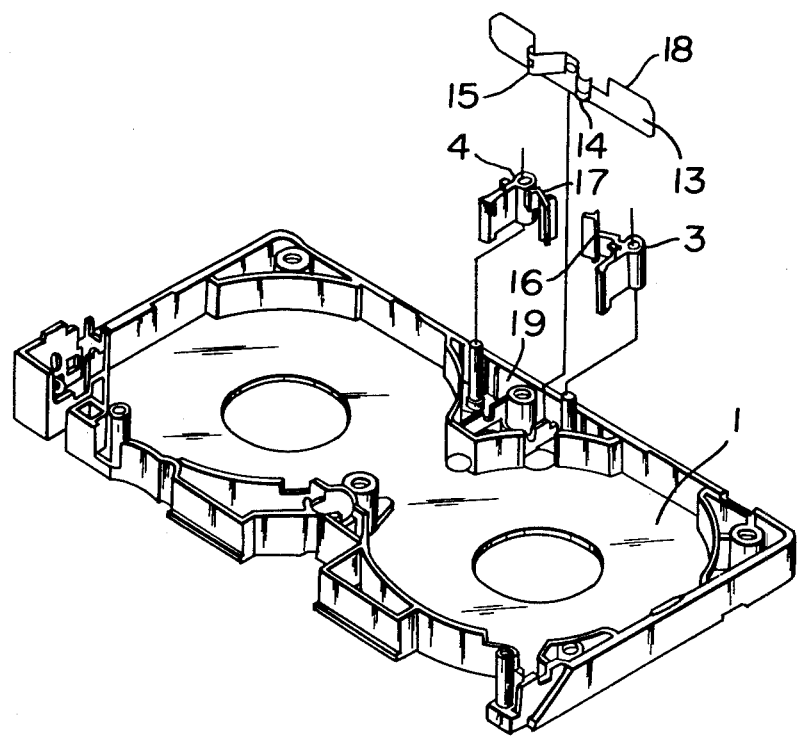
FIG. 2 is a partially assembled schematic view of one embodiment of the tape cassette according to the present invention.

Referring to FIG. 2, the brake (3) in the supply side and the brake (4) in the take-up side are connected in a half-case (1).

In the embodiment of the present invention, a resilient plate (13) is used instead of the coil springs. The resilient plate (13) comprises two bent parts (14), (15). The two bent parts (14), (15) are respectively contacted with the corresponding <-shaped part (16) of the brake (3) in the supply side and <-shaped part (17) of the brake (4) in the take-up side and the flat part (18) is contacted with the inner wall of the side wall (19) of the half-case (1).

The reel and the brake releasing lever are the same with those of the conventional one and accordingly, they are not shown in the drawing.

In this embodiment, the resilient plate (13) has two flat parts at both sides. The two flat parts are contacted with the inner side wall of the half-case. The brakes (3), (4) respectively have arms having a bent shape which is called as <-shaped part. The arms are respectively actuated by the bent parts (14), (15) of the resilient plate (13) whereby the tape is held without loosing it in the tape cassette.

In accordance with the present invention, the tape cassette is assembled with the resilient plate instead of the coil springs whereby the cost can be significantly reduced and the assembly operation can be significantly simplified and moreover, the maintenance is remarkably advantageous so as to attain a long life in comparison with the conventional tape cassette using the coil springs.

What is claimed as new and desired to be secured by Letters Patent of the United States is:

1. A tape cassette brake mechanism having a supply and a take-up reel of a tape cassette comprising:
   a half-case having a side wall;
   a resilient plate member which comprises at least one flat part and first and second bent parts connected to said flat part, said flat part contacting said side wall of said half-case; and,
   first and second brake members mounted on said half-case, said first and second bent parts respectively contacting said first and second brake members for selectively applying braking force to said reels wherein the resilient palte includes two flat parts at both sides and the two flat parts are contacted with said side wall of said half-case.

2. A tape cassette brake mechanism having a supply and a take-up reel of a tape cassette comprising:
   a half-case having a side wall;
   a resilient plate member which comprises at least one flat part and first and second bent parts connected to said flat part, said flat part contacting said side wall of said half-case; and,
   first and second brake members mounted on said half-case, said first and second bent parts respectively contacting said first and second brake members for selectively applying braking force to said reels wherein said first and second brake members include <-shaped arms and said first and second bent parts are respectively contacted with corresponding first and second <-shaped arms of the brake members.

3. A tape cassette brake mechanism having a supply and a take-up reel of a tape cassette comprising:
   a half-case having a side wall;
   a resilient plate member which comprises at least one flat part and first and second bent parts connected to said flat part, said flat part contacting said side wall of said half-case; and,
   first and second brake members mounted on said half-case, said first and second bent parts respectively contacting said first and second brake members for selectively applying braking force to said reels wherein the first and second bent parts of the resilient plate comprise a half width part of the resilient plate formed by bending and the remaining half width part being flat shaped.

* * * * *